United States Patent [19]

Müller et al.

[11] Patent Number: 4,548,736

[45] Date of Patent: Oct. 22, 1985

[54] PREPARATION OF PROTEIN FILMS

[75] Inventors: Michael F. Müller, Münster, Fed. Rep. of Germany; John D. Ferry, Madison, Wis.

[73] Assignee: Wisconsin Alumni Research Foundation, Madison, Wis.

[21] Appl. No.: 527,345

[22] Filed: Aug. 29, 1983

[51] Int. Cl.$^4$ .............................................. B01J 13/00
[52] U.S. Cl. .............................. 252/315.1; 260/112 B; 424/101; 424/107
[58] Field of Search .............................. 428/294, 293; 260/112 B, 117, 121, 112.5; 424/101, 107; 252/315.1

[56] References Cited

U.S. PATENT DOCUMENTS 2,576,006 11/1951 Ferry et al. .
4,347,841 9/1982 Benyó et al. .................... 260/112 B

OTHER PUBLICATIONS

Ferry et al., "Fibrin Clots, Fibrin Films . . . " Journal of Clinical Investigation, vol. 23, 1944, pp. 566–572.
Bailey et al., "Fibrin Films in Neurosurgery . . . " Journal of Clinical Investigation, vol. 23, 1944, pp. 597–600.
Ferry et al., "Human Fibrin in the Form of an Elastic Film" American Chemical Society Journal, vol. 69, 1947, pp. 400–409.
Clark et al., "Electron Microscopy of Network Structures . . . " International Journal of Peptide Protein Research, vol. 17, 1981, pp. 380–392.
Miyazaki et al., "Use of Fibrin Film as a Carrier for Drug Delivery . . . ", Chemical Pharm. Bulletin, vol. 30, 1982, pp. 3405–3407.

Primary Examiner—Edith Buffalow
Attorney, Agent, or Firm—Isaksen, Lathrop, Esch, Hart & Clark

[57] ABSTRACT

A method to prepare protein films from protein gels is disclosed which utilizes the process of osmosis to remove excess fluid from protein gels without destroying the structural integrity of the protein. The method is conducted by first preparing a protein gel in a solvent, then contacting the gel with one side of a semipermeable membrane permeable to the solvent in which the gel was prepared, next adding a concentrated polymer solution to the other side of the membrane which membrane is impermeable to the polymer so as to cause movement of solvent from the gel, through the membrane, and into the polymer solution, and thus removing solvent from the gel for a period of time sufficient to contract the gel to a desired thickness.

20 Claims, 2 Drawing Figures

PREPARATION OF PROTEIN FILMS

TECHNICAL FIELD

The invention described herein was made in the course of work under a grant or award from the Department of Health and Human Services.

The present invention relates to protein films and methods to prepare protein films.

BACKGROUND OF THE INVENTION

Protein films can theoretically be made from any protein which can form a gel. The process involves a transition from low protein concentration to high protein concentration.

Gel is the general name for a jellylike material which is a dilute solution of crosslinked macromolecules. Fibrin clot is the specialized name for a protein gel which is formed by the reaction in solution of fibrinogen and a specific proteolytic enzyme, usually thrombin. Other proteolytic enzymes such as reptilase or ancrod produce clots of somewhat different properties. Depending on the pH and ionic strength of the reaction solution, a coarse fibrin clot, an intermediate fibrin clot, or a fine fibrin clot will be formed. J. D. Ferry and P. R. Morrison, J. Amer. Chem. Soc., 69, 400 (1947). Other protein gels can be formed by cooling solutions of gelatin or by heat denaturation of proteins from the class including, but not limited to, serum albumin, insulin, ribonuclease, or alpha-chymotrypsin. A. H. Clark, F. J. Fudge, J. B. Richards, J. M. Stubbs, A. Suggett, Int. J. Protein Res. 17, 380–392 (1982). Gel formation of all types is well known in the art.

Some early protein films were coarse fibrin films developed in the 1940's. J. D. Ferry and P. R. Morrison, J. Clin. Invest. 23, 566 (1944). These films were made from coarse clots of fibrin which clots were made by the reaction in solution of fibrinogen with the proteolytic enzyme thrombin. Coarse clots consist of thick bundles of fibers having average bundle diameters up to approximately 3000 Angstroms. The coarse clots have void space in them such that excess solvent exists in the empty spaces between the bundles. Conventionally, protein film is made from the coarse clot by using pressure to drive out excess solvent from the clot. When pressure is applied to the coarse clot the solvent runs out through channels in the clot. The structural integrity of the thick fiber bundles is generally maintained in the resulting film.

Films made from coarse clots are useful because the natural structure of the protein fibers is preserved and the fibrous elements are arranged to lie primarily in or parallel to the plane of the film though oriented at random within that plane. Film made from coarse clots can be stretched 100 percent with subsequent elastic recovery after release of tension. The film has been used in surgical applications. Films made from coarse clots could also be used in the treatment of burns. Because coarse fibrin film is a native protein with no chemical modification or denaturation, implants are gradually absorbed with no tissue reactions. O. T. Bailey and F. D. Ingraham, J. Clin. Invest., 23, 597 (1944).

Another potential use of coarse fibrin films is for controlled release of therapeutic agents such as drugs. However, because of the great amount of void space inherent in coarse films, drug delivery can not be controlled very easily. Drugs migrate through channels in the coarse films, just as solvent runs out under pressure, rather than being released gradually as the coarse fibrin film is absorbed by the body. Modified coarse fibrin films have been used for controlled drug delivery in the eye. S. Miyazaki, K. Ishi, and M. Takada, Chem. Pharm. Bull., 30, 3405–3407 (1982). However, in the technique described in this reference, fibrin film was dried and then ground up and the mixture was compressed at 160° to 170° C. under high pressure. This procedure destroys the integrity of the natural fibrous network and undoubtedly produces substantial chemical modification.

Protein films made from fine or intermediate fibrin clots or made from gelatin or heat-denatured protein gels would have uses similar to the uses of coarse fibrin film. However, attempts to make protein film from either fine or intermediate fibrin clots or from gelatin or heat-denatured protein gels by the conventional pressure method proved unsuccessful. Fine fibrin clots consist of thin bundles of fiber having bundle diameters of less than approximately 200 Angstroms. The solvent in fine fibrin clots is more uniformly distributed among the fine fibers rather than existing in void spaces between the bundles, and cannot be drained by applying pressure. Attempts to force water out by exerting pressure on fine or intermediate fibrin clots destroyed the structural integrity of the fibers themselves. Pressure exerted on gels of gelatin or heat-denatured proteins similarly broke the gels up.

SUMMARY OF THE INVENTION

The present invention is summarized in that a novel fibrin film has been prepared from a fine fibrin clot. A general method for preparing protein films in accordance with the invention, including fibrin films, includes the steps of first preparing a protein gel from materials which have characteristics desired in the protein film product, then removing excess solvent from the gel by the process of osmosis until the gel has contracted to the desired thickness.

The present invention thus provides a method for the preparation of protein films from protein gels without destroying the structural integrity of the protein.

A fine fibrin film is prepared from a fine fibrin clot by such a method to provide a film comprised of a network of fiber bundles lying substantially in one plane and wherein each fibrin bundle has an average diameter of less than approximately 200 Angstroms. The orientation of the fiber structure in the film plane gives it enhanced strength and extensibility in the lateral directions. Mechanical properties such as elastic modulus and extent of stress relaxation can be varied to suit requirements of stiffness and conformability to uneven surfaces. Fine fibrin film may be used to obtain controlled release of drugs of high molecular weight. Release of such drugs from an implanted fine film would depend on the rate of absorption of the film itself in vivo rather than the drug being released freely from channels or voids in the film as is the case with film made from coarse fibrin clots prepared by pressing.

Other objects, advantages, and features of the present invention will become more apparent from the following detailed discussion.

DESCRIPTION OF THE PREFERRED EMBODIMENT

Figure 1:
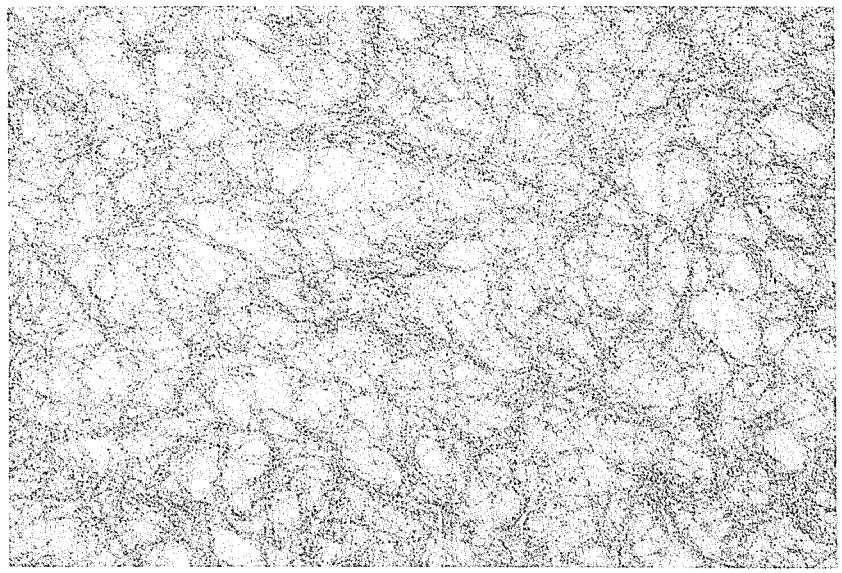
FIG. 1 is a high voltage electron photomicrograph of fine fibrin film, under 48,000 × magnification.

The first step in the method of the present invention is to form a protein gel. Certain proteins will form gels through the action of a proteolytic enzyme on a soluble protein to form the specialized gel such as a fibrin clot, or by cooling a solution of a protein such as gelatin, or by heat denaturation of a protein. Gel formation of all types is well-known in the art. Fibrinogen plus the enzyme thrombin will form the fibrin clot. Fine fibrin clots will form when the pH is approximately 8.5 and the ionic strength is approximately 0.40. Coarse fibrin clots will form when the pH and ionic strength is decreased to a pH of approximately 6.3 and an ionic strength of approximately 0.15. Intermediate fibrin clots will form under conditions of pH and ionic strength intermediate between those conditions necessary to form fine fibrin clots and coarse fibrin clots. When a warm gelatin solution is cooled, a gel will form. A protein from the class including, but not limited to, serum albumin, insulin, ribonuclease or alpha-chymotrypsin will form a gel after heating to a denaturing temperature.

The clot or gel is tailored to the characteristics of the film desired. The properties of clots used to form films will depend on the particular proteolytic enzyme selected, and also on whether covalent bonds are introduced. Typical proteolytic enzymes which may be used include, but are not limited to, thrombin, reptilase, or ancrod. In fibrin clots, it may be desirable to have Factor XIII and calcium present to induce covalent bonds by ligation which strengthen the final film. The solution should be left in its initial container for up to approximately 100 times the clotting time in order to insure a well-developed structure in the clot.

Film is made from a gel in the method of the present invention by unilateral shrinkage of the gel by osmotic removal of excess solvent until the gel thickness has contracted to the desired level. The osmosis can shrink the gel by a factor of 3 to 15. Osmosis involves the transfer of solvent from a first solution of lower concentration to a second solution of higher concentration across a membrane which is impermeable to the solute involved. In our case, the second solution contains a polymeric solute such as polyethylene glycol, cross-linked dextran, or sucrose polymer; the first solution is the gel itself. Solvent is transferred spontaneously from the gel to the concentrated polymer solution across a membrane which is impermeable to the polymeric solute but easily permeable to salts or other compounds of low molecular weight. The polymer solution has the same composition of salts as the gel and these components do not influence the osmosis. A suitable semipermeable membrane is cellophane, prepared with a molecular weight exclusion limit of 10,000 to 14,000 daltons. The polymeric solute should have a high enough molecular weight to be excluded from the membrane and its concentration should be very high to facilitate the osmosis; for example, the concentration of polyethylene glycol should be approximately 50% by weight. The specific concentration will depend on the polymeric solute used.

After the semipermeable membrane and polymer solution have been contacted with the gel, the next step is to allow the osmotic removal of solvent from the gel to proceed until the gel has contracted to the desired thickness with no noticeable change in the area of the gel. The time required for such contraction may be 12 to 20 hours, during which the gel will contract by a factor of 3 to 15. The concentration of protein in films made from gelatin or from heat-denatured proteins will be approximately larger than 30% by weight. The resulting film can be used immediately, or can be stored in the gel solvent. Alternatively, the film can be plasticized with glycerol, for example, by soaking in 99% glycerol for approximately 24 hours, changing the glycerol approximately three times. The glycerol-plasticized films do not dry out.

Figure 2:
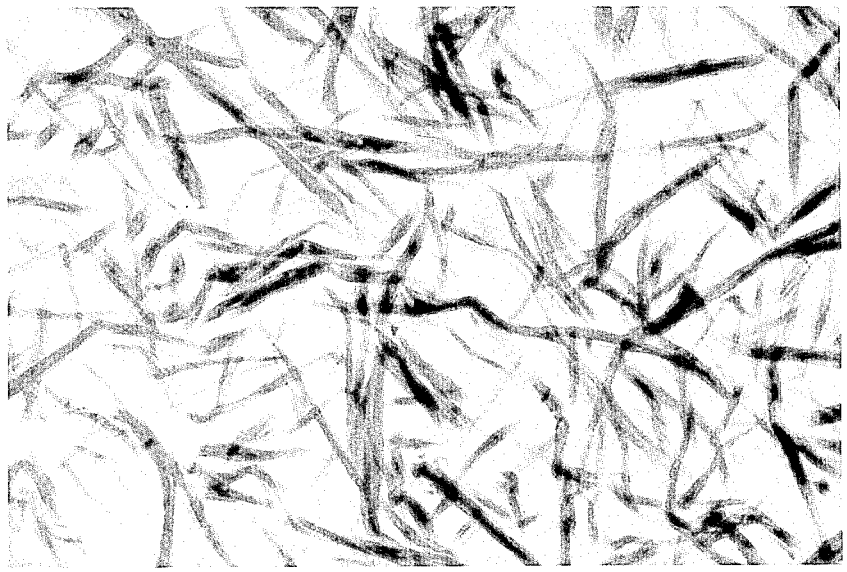
FIG. 2 is a high voltage electron photomicrograph of coarse fibrin film, under 10,000 × magnification.

Fine fibrin film as prepared in the instant invention consists of a network of bundles of long thin rodlike fibers having a bundle diameter of less than approximately 200 Angstroms. FIG. 1 is an electron photomicrograph of fine fibrin film. As shown in FIG. 1, the bundles lie primarily in the plane of the film rather than standing on end. FIG. 2 is an electron photomicrograph of the prior art protein film coarse fibrin film.

Comparing FIGS. 1 and 2, the bundles of fibers in fine fibrin film are closer together than the bundles of fibers in coarse fibrin film, which have an average bundle diameter of approximately 3000 Angstroms. The lack of large amounts of void space in fine fibrin film means that, unlike coarse fibrin film, fine fibrin film is well suited for controlled release of certain therapeutic agents. Therapeutic agents could be added to fine fibrin film preferably by adding the agents in the initial step of clot formation. Suitable therapeutic agents would be drugs having a molecular weight of more than approximately 100,000 daltons, because such drugs are of a size larger than the average interbundle distance in fine fibrin film; the drugs would be absorbed slowly as the fine fibrin film is absorbed by the body, rather than running out through channels in the film.

Alternatively, it is also possible to attach therapeutic agents to the film by chemical reaction. In this situation it may be possible to obtain controlled release of low molecular weight drugs, for example, those drugs with a molecular weight of 1,000 daltons or less. The film and drug would be a coherent solid object which could be formed to fit into a specific anatomical site.

Films prepared from gelatin or heat-denatured proteins typically have a protein concentration of approximately larger than 30% by weight which is an increase in concentration of protein of approximately 5 times the concentration in the original gel. The structural integrity of the protein is maintained in the films made by osmosis from gelatin or heat-denatured proteins.

Protein films in general may have several important biomedical applications, including structural repair and possibly suturing. The films are very elastic and strong. Fibrin films are native protein with no chemical modification or denaturation, so that implants can be gradually absorbed with no tissue reactions.

The following examples further illustrate the present invention. These examples are not intended to limit the invention in any manner.

EXAMPLES

EXAMPLE 1

Bovine fibrinogen (Miles Laboratories, 95% clottable) was dissolved in a large volume of sodium chloride-imidazole buffer, pH 8.5, ionic strength 0.41. A solution containing 10 grams per liter of fibrinogen with two units per milliliter of Trasylol (a proteolytic inhibitor from FBA Pharmaceuticals) and 0.003 M calcium chloride (to introduce covalent bonds by ligation—sufficient fibrin stabilizing factor, Factor XIII, being present as a desired impurity) was mixed with sufficient bovine thrombin (from Parke, Davis and Company) to give a clotting time of about 10 minutes, and poured into a tray. The resulting transparent clot was allowed to stand at room temperature, covered by a lid, for 16 hours in order to allow the structure to become fully developed.

The resulting transparent clot was freed from the tray at the edges with a spatula and transferred to the center of a much larger tray. For easy removal of the clot, the first tray had removable walls so that the clot could be easily removed. The clot in the second tray was covered by a semipermeable membrane which was a sheet of cellophane cut from large dialysis tubing (Union Carbide Corporation; specified molecular weight cutoff 12,000 daltons) that had been presoaked in sodium chloride-imidazole solution. The cellophane was clamped at the edges but sagged in the center so it was in contact with the entire surface of the clot. The shallow cavity formed by the sagging was filled with 200 milliliters of a 50% by weight solution of polyethylene glycol (Polyscience, Inc., nominal molecular weight 18,500) dissolved in the sodium chloride-imadizole fluid, in other words, dissolved in the solvent in which the clot was prepared. The polyethylene glycol solution was stirred by occasionally tipping the tray. Osmotic removal of fluid from the clot was allowed to proceed for 20 hours, during which time the clot thickness contracted by a factor of about 15 with no noticeable change in area.

EXAMPLE 2

A sample of pigskin gelatin was obtained from Rousselot S.A., Paris. Its isoelectric point was 7.0, the pH of the aqueous solution was 5.1, and the number average molecular weight was 35,000. The gelatin was dissolved in water at 50° C. at a concentration of 5.7% by weight. The solution was kept in a covered tray for several hours at 70° C., then cooled to room temperature and held for 5 hours. The resulting transparent gel was freed from the first tray at the edges with a spatula and transferred to the center of a much larger tray. The gel was covered by a sheet of cellophane cut from large dialysis tubing, as in Example 1, that had been presoaked in water, the solvent in which the gel had been prepared. The cellophane was clamped at the edges but sagged in the center so it was in contact with the entire surface of the gel. The shallow cavity formed by the sagging was filled with 200 milliliters of a 50% by weight solution of polyethylene glycol dissolved in water. The polyethylene glycol solution was stirred by occasionally tipping the tray. Osmotic removal of fluid from the gel was allowed to proceed for 20 hours, during which time the gel thickness contracted by a factor of about 5 with no noticeable change in area, to a gelatin concentration of 39%.

EXAMPLE 3

Bovine serum albumin (B.S.A., Miles Laboratories, Pentex, code 82-001, 98%) was dissolved in 0.02 M aqueous sodium chloride at a concentration of 9.1% by weight, and the pH was adjusted to 7.0 with sodium hydroxide. The solution was kept in a covered tray for 3 hours at 70° C. and the resulting gel of denatured albumin was cooled to room temperature. The resulting transparent gel was freed from the tray at the edges with a spatula and transferred to the center of a much larger tray. As in examples 1 and 2, the gel was covered by a sheet of cellophane cut from large dialysis tubing. This sheet had been presoaked in 0.02 M aqueous sodium chloride. The cellophane was clamped at the edges but sagged in the center so that it was in contact with the entire surface of gel. The shallow cavity formed by the sagging was filled with 200 milliliters of a 50% by weight solution of polyethylene glycol dissolved in aqueous sodium chloride, the same solvent in which the gel had been prepared. The polyethylene glycol solution was stirred by occasionally tipping the tray. Osmotic removal of fluid from the gel was allowed to proceed for 20 hours, during which time the gel thickness contracted by a factor of about 5 with no noticeable change in area, to a bovine serum albumin concentration of 40%.

It is to be understood that modification of the above-described method for carrying out the present invention is possible within the spirit of the present invention and thus the present invention should not be limited to the above-described specification but should be interpreted in accordance with the following claims.

We claim:

1. A method of making protein films comprising the steps of:
    (a) preparing a protein gel in a solvent;
    (b) placing the protein gel in contact with one side of a semipermeable membrane which is permeable to the solvent in which the gel was prepared;
    (c) adding a concentrated polymer solution to the other side of the semipermeable membrane, which membrane is impermeable to the polymer, said polymer solution comprising a polymeric solute dissolved in a solvent to a concentration sufficient to cause osmosis of the solvent from the gel into the polymer solution; and
    (d) removing solvent by osmosis from the gel for a period of time sufficient to contract the gel to a desired thickness.

2. The method of claim 1, wherein the semipermeable membrane is cellophane.

3. The method of claim 1 wherein the polymeric solute is selected from the group consisting of polyethylene glycol, crosslinked dextran, and sucrose polymer.

4. The method of claim 1, further comprising the step of adding a plasticizing agent to the film so that the film will not dry out.

5. The method of claim 4 wherein the plasticizing agent is glycerol.

6. A protein film made by the method of claim 1.

7. The protein film claimed in claim 6 wherein the protein gel includes a coarse fibrin clot.

8. The protein film claimed in claim 6 wherein the protein gel includes a fine fibrin clot.

9. The protein film claimed in claim 6 wherein the protein gel includes an intermediate fibrin clot.

10. A method for making protein films comprising the steps of:
    (a) preparing a protein gel in a solvent;
    (b) placing the protein gel in contact with one side of a semipermeable membrane which has a molecular weight exclusion limit sufficient to exclude the polymer;
    (c) adding a concentrated polymer solution to the other side of the semipermeable membrane, which polymer solution is comprised of the same solvent in which the gel was prepared and a polymeric solute selected from the group of polyethylene glycol, crosslinked dextran, and sucrose polymer, to which solute the semipermeable membrane is impermeable, and which solute is dissolved in the solvent to a concentration sufficient to cause osmosis of solvent from the gel, through the semipermeable membrane, and into the polymer solution; and (d) removing solvent by osmosis from the gel for a period of time sufficient to contract the gel to a desired thickness.

11. The protein film made by the method of claim 10.

12. The protein film claimed in claim 11 wherein the protein gel includes a coarse fibrin clot.

13. The protein film claimed in claim 11 wherein the protein gel includes a fine fibrin clot.

14. The protein film claimed in claim 11 wherein the protein gel includes an intermediate fibrin clot.

15. The method of claim 10, further comprising the step of adding a plasticizing agent to the film so the film will not dry out.

16. The method of claim 15 wherein the plasticizing agent is glycerol.

17. A protein film made by the method of claim 16.

18. The protein film claimed in claim 17 wherein the protein gel includes a coarse fibrin clot.

19. The protein film claimed in claim 17 wherein the protein gel includes a fine fibrin clot.

20. The protein film in claim 17 wherein the protein gel includes an intermediate fibrin clot.

* * * * *